Dec. 27, 1927.
S. S. GROTTA
1,653,848
METHOD AND APPARATUS FOR MAKING GLASS TUBING
Filed March 21, 1925
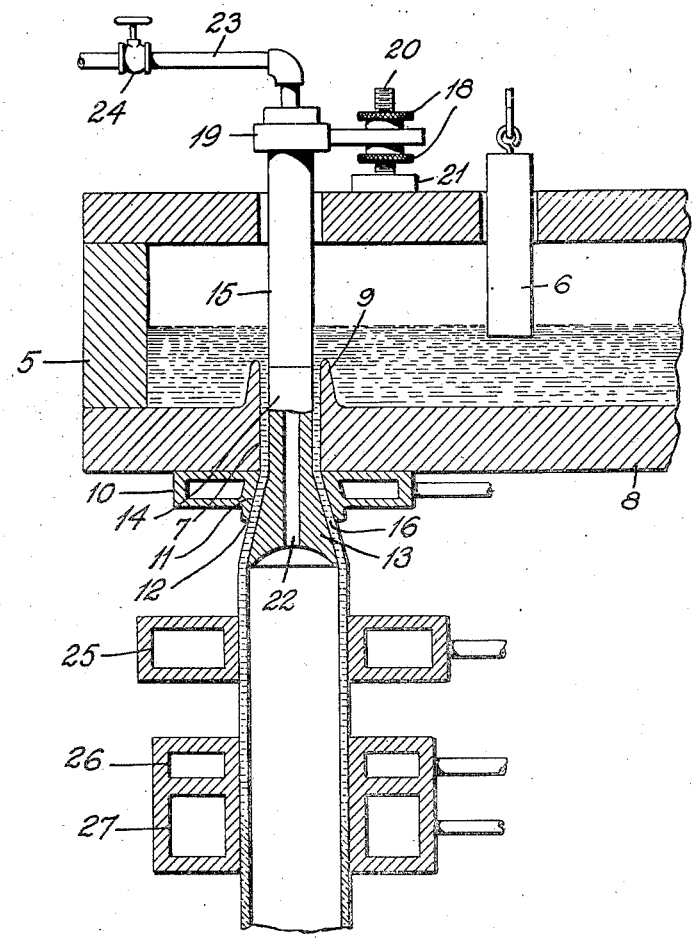
Inventor:
Sidney S. Grotta
by Robson D Brown
Atty.

Patented Dec. 27, 1927.

1,653,848

UNITED STATES PATENT OFFICE.

SIDNEY S. GROTTA, OF HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR MAKING GLASS TUBING.

Application filed March 21, 1925. Serial No. 17,249.

My invention relates to the manufacture of glass tubing, and it has special reference to the manufacture of such tubing by continuously feeding molten glass in tubular form from an outlet provided in the bottom of a glass container, and causing the tubular stream to solidify in proper size and shape.

One object of my invention is to provide a simple and efficient method and means for regulating the thickness of the wall of a continuously flowing stream of molten glass of tubular form issuing from an annular opening, by the adjustment of the effective size of said opening.

Another object of my invention is to provide means for varying the diameter of the tube by substituting a forming element of one diameter for that of another.

The single figure of the accompanying drawing is a vertical sectional view showing somewhat diagrammatically, an apparatus constructed in accordance with my invention.

In the drawing, the numeral 5 indicates a glass container, herein shown as a part of a forehearth extending from a glass tank or furnace, not shown. A gate 6 may be provided to maintain a suitable glass level and the molten material may be maintained to a proper operating temperature by heating or cooling means which may be of common design and which are therefore, not shown herein.

A discharge outlet 7 is provided in the bottom 8 of the container 5, and is surrounded by a vertical annular wall 9 formed on and projecting upwardly from said bottom. An internally cooled forming member 10 is located beneath the container 5 and in axial alinement with the discharge outlet 7, forming an extension of the outlet. The interior surface 11 of the forming member 10 expands toward a lower opening 12 thereof, forming a conical configuration corresponding to a conical end 13 formed on a head 14 secured to the lower end of a mandrel 15 which cooperates with said forming member 10 to produce an annular outlet 16 for the issuing glass.

The mandrel 15 is vertically adjusted to reduce or increase the width of the annular opening 16 of the outlet 7 by means of hand nuts 18 cooperating with an arm 19 which is carried by the top of the mandrel 15.

The hand nuts 18 are operable on a threaded shaft 20 secured in a fixed base 21 and, by their adjustment, they raise or lower the mandrel 15 and the conical end 13 secured thereto. When the mandrel is raised, the width of the annular opening 16 is reduced, while the lowering of the mandrel enlarges this opening. Such variation in the size of the discharge opening decreases or increases the thickness of the wall of the tube of glass issuing from the opening 16.

The mandrel 15 is provided with an air passage 22 which is connected by a pipe 23 to a suitable source of air under pressure. A valve 24 is provided to regulate the supply of cooling air that flows through the passage 22, and a cooling medium is thus supplied to the interior of the tube as it emerges from the annular opening 16, so as to counterbalance the cooling effect of the atmosphere surrounding the exterior of the tube, thereby preventing any undue temperature strains in the tube structure and preventing any tendency of the tube to collapse. Reheating, sizing and cooling means may be provided, as indicated in diagram by 25, 26 and 27, respectively, but as these form no part of the present invention, I refer to the copending application of George E. Howard, Serial No. 642,021, filed May 28, 1923, for a description of similar devices which are adaptable to my present invention.

In the operation of the apparatus described above, the glass issues from the outlet 7 of the container 5 by gravity, which may be assisted by tube-drawing implements commonly used for drawing glass, and it is formed into an annular stream between the outside of the mandrel 15 and the outlet 7 of the container.

On reaching the conical end 13 of the mandrel 15, the diameter of the tube thus formed is caused to expand thereon and the thickness of said tube is determined by the proximity of said conical end to the cooperating conical configuration formed in the forming member 10.

The tube of plastic glass, after emerging from between the forming member 10 and the conical end 13 of the mandrel 15, continues to expand on said conical end until the base of the cone is reached, and then travels downward in a tubular form to and through the sizing device 25 which may reduce its diameter slightly so as to retain the same diameter for different thicknesses of wall and may also iron out any irregularities of the tube.

The thickness of the walls of the tube may be decreased by adjusting the mandrel upwardly by means of the hand nuts 18, and may be increased by similarly adjusting the mandrel downwardly.

Tubes of smaller or greater diameter may be produced by substituting, for the head portion 14 of the mandrel 15, a cone of a different base diameter, but with the same conical inclination. The sizing, heating and cooling devices must necessarily be changed to accommodate any change of the mandrel end, although the same devices will be adapted for the adjustment of a particular mandrel end.

This invention is not limited to the details of construction shown herein, but may be modified as desired within the scope of the appended claims.

I claim as my invention:

1. In combination, a glass container provided with an outlet, means for causing the glass to issue from said outlet in a tubular stream, and a conical former adjacent to said outlet for expanding the diameter of the stream, the base of said former being of greater diameter than said outlet.

2. In combination, a container for molten glass having a downwardly opening discharge outlet, a tubular forming device projecting downwardly into the glass and through the outlet, said former arranged to provide with the walls of the outlet an outwardly divergent annular passage for the issuance of glass, means for supplying air to said tubular former, and a die for imparting a fixed diameter to the tube.

3. In combination, a glass container provided with an outlet, and means associated with said outlet to form an annular glass-discharging opening of greater diameter than the said outlet.

4. In combination, a glass container provided with an outlet, means associated with said outlet to form an annular glass-discharging opening of greater diameter than the said outlet, and means for varying the width of the said annular opening.

5. In combination, a glass container provided with an outlet, means for causing the glass to issue from said outlet in a tubular stream, an adjustable outwardly enlarging conical member for expanding the stream as it issues from said outlet and for determining the inside diameter thereof, and an outlet ring having a conical opening surrounding said first named conical member and cooperating therewith to determine the outside diameter of said stream.

6. In combination, a glass container provided with an outlet orifice, a mandrel positioned within said outlet orifice for cooperating with the wall of the orifice to cause the glass to pass therethrough in a tubular stream, an outwardly enlarging conical head carried at the outer end of said mandrel to expand said tubular stream by engaging the interior of said tubular stream as it issues from said orifice, an outlet ring having a conical opening in alignment with the outlet and arranged to encircle said head, and means for adjusting said mandrel and conical head axially of said outlet ring to alter the thickness of wall of the tubular stream issuing from the annular opening formed by the said coacting conical members.

7. In combination, a container for molten glass having a downwardly extending outlet, an internally cooled annular forming member disposed below said outlet and having an opening of downwardly increasing diameter forming a continuation of said outlet, a vertically adjustable mandrel extending through said outlet and a downwardly enlarging conical head carried by said mandrel and adapted to cooperate with said annular forming member to expand and shape the annular stream of glass discharged through said outlet.

8. In combination, a container for molten glass having a downwardly extending outlet, an internally cooled annular forming member disposed below said outlet and having an opening of downwardly increasing diameter forming a continuation of said outlet, a vertically adjustable mandrel extending through said outlet, a downwardly enlarging conical head carried by said mandrel and adapted to cooperate with said annular forming member to expand and shape the annular stream of glass discharged through said outlet, and means for directing air through said mandrel and into the descending tube of glass.

9. The method of making glass tubing that comprises causing molten glass to flow downwardly in an annular cylindrical stream, and thereafter in a downwardly enlarging conical stream, and forming said conical stream into a tube.

10. The method of making glass tubing that comprises causing molten glass to flow downwardly in an annular cylindrical stream, and thereafter in a downwardly enlarging conical stream, forming said conical stream into a tube, and cooling the exterior and the interior of said tube.

11. The method of making glass tubing that comprises causing molten glass to flow downwardly in an annular cylindrical stream and thereafter in a conical downwardly enlarging stream, cooling the exterior of said conical stream forming a tube from said conical stream, and introducing cooling air to the interior of the tube.

12. Apparatus for drawing glass tubing, comprising a receptacle for molten glass having an outlet opening in the bottom thereof, an annular wall surrounding said outlet and projecting upwardly from the bottom of the container, a conical outlet ring associated with the lower portion of the outlet, the walls of said outlet ring diverging from the outlet, a forming device projecting into the glass and through the outlet to form an annular passage for the issuance of glass, and a conical head associated with the forming device to form a divergent annular passage for expanding the annular stream.

13. Apparatus for drawing glass tubing, comprising a receptacle for molten glass having an outlet opening in the bottom thereof, an annular wall surrounding said outlet and projecting upwardly from the bottom of the container, a conical outlet ring associated with the lower portion of the outlet, the walls of said outlet ring diverging from the outlet, a forming device projecting into the glass and through the outlet to form an annular passage for the issuance of glass, a conical head associated with the forming device to form a divergent annular passage for expanding the annular stream, and means for adjusting the conical head relative to the walls of the outlet ring to regulate the wall thickness of the tube.

14. Apparatus for drawing glass tubing, comprising a receptacle for molten glass having an outlet opening in the bottom thereof, an annular wall surrounding said outlet and projecting upwardly from the bottom of the container, a conical outlet ring associated with the lower portion of the outlet, the walls of said outlet ring diverging from the outlet, a tubular forming device projecting into the glass and through the outlet to form an annular passage for the issuance of glass, a conical head associated with the tubular forming device to form a divergent annular passage for expanding the annular stream, and means for applying cooling air to the forming device and the interior of the tube.

15. Apparatus for drawing glass tubing, comprising a receptacle for molten glass having an outlet opening in the bottom thereof, an annular wall surrounding said outlet and projecting upwardly from the bottom of the container, a conical outlet ring associated with the lower portion of the outlet, the walls of said outlet ring diverging from the outlet, a tubular forming device projecting into the glass and through the outlet to form an annular passage for the issuance of glass, a conical head associated with the tubular forming device to form a divergent annular passage for expanding the annular stream, means for adjusting the conical head relative to the walls of the outlet ring to regulate the wall thickness of the tube, and sizing dies for determining the size of the tube after passing the forming device.

16. Apparatus for forming glass tubing comprising a container for molten glass provided with an annular discharge outlet having the inner and outer walls of its outer end portion parallel with each other and enlarging outwardly in diameter, and the inner and outer walls of its inner end portion parallel with each other and uniform in diameter.

17. Apparatus for forming glass tubing comprising a container for molten glass provided with an annular discharge outlet having the inner and outer walls of its outer end portion parallel with each other and enlarging outwardly in diameter and the inner and outer walls of its inner end portion parallel with each other and uniform in diameter, and means for supporting the inner wall of said outlet for axial adjustment relatively to the outer wall of the outlet.

18. Apparatus for forming glass tubing comprising a container for molten glass provided with an annular discharge outlet having the inner and outer walls of its outer end portion parallel with each other and enlarging outwardly in diameter, and the inner and outer walls of its inner end portion parallel with each other and uniform in diameter, and means for conducting fluid under pressure into the glass tubing issuing from said outlet.

19. Apparatus for forming glass tubing comprising a container for molten glass having a discharge opening of uniform cross-sectional area from its inner end for part of its length, and then gradually enlarging in cross-sectional area for the remainder of its length, a mandrel extending through said discharge opening in spaced relation to the wall thereof and cooperating with the wall of said discharge opening to produce an annular discharge outlet for glass from the container, said mandrel having an enlarged outer end portion, and means for adjusting said mandrel axially of said discharge opening to vary the thickness of the stream of glass issuing from said discharge outlet.

20. The method of forming glass tubing, which comprises passing molten glass from a source of supply in an annular stream of uniform diameter, then gradually and regularly expanding the stream substantially to frusto-conical form, and then drawing glass from the larger end of said frusto-conical stream in the form of a tube of substantially uniform diameter.

21. The method of forming glass tubing, which comprises passing molten glass from a supply body in an annular stream of uniform diameter, then passing glass from the outer end of said stream in an outwardly enlarging frusto-conical stream, finally passing glass from the larger end of the frusto-conical stream in the form of a tube of substantially uniform diameter, and introducing fluid under pressure into said tube.

22. The method of forming glass tubing, which comprises passing molten glass from a supply body in an annular stream of substantially uniform diameter, then passing glass from the outer end of said stream in an outwardly enlarging frusto-conical stream, cooling said frusto-conical stream externally, and finally passing glass from the larger end of the frusto-conical stream in the form of a tube of substantially uniform diameter.

23. The method of forming glass tubing, which comprises passing molten glass from a supply body in an annular stream of substantially uniform diameter, then passing glass from the outer end of said stream in an outwardly enlarging frusto-conical stream, cooling said frusto-conical stream externally, finally passing glass from the larger end of the frusto-conical stream in the form of a tube of substantially uniform diameter, and introducing cooling fluid into said tube.

24. The method of forming glass tubing, which comprises conducting glass from a body of molten glass in an annular stream of substantially uniform diameter, then expanding said stream diametrically until it has predetermined inner and outer diameters, and finally continuing the stream in annular form with said predetermined inner and outer diameters substantially maintained to produce glass tubing of a desired size and having a wall of desired thickness.

Signed at Hartford, Connecticut this 17th day of March, 1925.

SIDNEY S. GROTTA.